United States Patent [19]
Schaller

[11] 3,899,943

[45] Aug. 19, 1975

[54] HIGH SPEED BAR PEELER

[75] Inventor: Robert L. Schaller, Baldwinsville, N.Y.

[73] Assignee: Sundstrand Syracuse, Inc., Syracuse, N.Y.

[22] Filed: Feb. 4, 1974

[21] Appl. No.: 439,250

[52] U.S. Cl. ................................................. 82/20
[51] Int. Cl.² ......................................... B23D 5/12
[58] Field of Search ......................................... 82/20

[56] References Cited
UNITED STATES PATENTS

| | | | |
|---|---|---|---|
| 2,311,998 | 2/1943 | Pope | 82/20 |
| 3,449,989 | 6/1969 | Bliss | 82/20 |
| 3,486,403 | 12/1969 | Schweer et al. | 82/20 |

FOREIGN PATENTS OR APPLICATIONS

| | | | |
|---|---|---|---|
| 1,167,154 | 8/1960 | Germany | 82/20 |

Primary Examiner—Leonidas Vlachos
Attorney, Agent, or Firm—Wegner, Stellman, McCord, Wiles & Wood

[57] ABSTRACT

A bar peeler positionable in a process line for removing material from a bar rotating at a high speed comprising, a frame having a cutting station, a bar feed-in station in advance of said cutting station, a bar feed-out station beyond said cutting station, means at each of the two feed stations for rotating and linearly advancing a bar, a tubular cutting head at the cutting station having a central passage through which the bar travels and a plurality of cutting tools for travel circumferentially of the bar, means for rotating said cutting head about an axis concentric with said bar and in a direction to obtain a differential speed, means for setting said cutting tools to machine the bar to a predetermined diameter, means for gaging bar diameter after cutting, means responsive to the gaging means determining a size variation in the bar for adjusting the cutting tools, and means for maintaining a pre-set relative speed between said bar and cutting tools.

5 Claims, 7 Drawing Figures

HIGH SPEED BAR PEELER

BACKGROUND OF THE INVENTION

This invention pertains to a bar peeler for removing material from a bar which rotates at a high speed with a cutting station having a tubular rotatable cutting head with bar rotating and feeding means both in advance and beyond the cutting station whereby the bar is machined as it is advanced through the cutting head and with the cutting head rotating in a direction to establish a differential or relative speed therebetween to a range feasible for cutting. Control circuitry sets up the various components of the bar peeler for the desired size of bar diameter and gages bar diameter to maintain the desired bar diameter during operation. Also, means maintains the desired relative speed between the cutting tools and the bar and which matches a pre-set desired relative speed.

Conventionally, bar stock has been passed through a bar peeler to remove a large amount of material from the bar diameter in a single pass by use of a rotatable cutting head with multiple cutters and with the bar being pushed through the cutting head. In such a system, the bar has not been rotated and, thus, the only rotation involved is that of the cutting head. The speed of rotation of the cutting head may be set properly for the cutting action of the cutting tools carried by the head whereby the tools operate at a surface speed within the acceptable range for the cutting tools. Such a bar peeler operates independently of a process line for the bar since it relies upon a nonrotating bar passing through the cutting head and with the surface speed of the cutting tools being selected solely by the speed of rotation of the cutting head. Such a bar peeler is not adaptable to a process line operating on bars of substantial length wherein other process steps, such as centerless grinding of the bar, rely upon high speed rotation of the bar. If such bar rotating at a high speed were to be presented to the cutting tools of the cutting head, the tools would not stand up.

SUMMARY

A primary feature of the invention disclosed herein is to provide a centerless bar peeler operable for machining a bar at high speed and usable in a process line wherein the bar is linearly advanced through a tubular cutting head carrying cutting tools which rotate in either the same or the opposite direction as the bar to obtain a differential speed between the bar and tools which provides a surface speed for cutting which is acceptable to the cutting tools while, at the same time, other equipment in the process line, such as a centerless grinder, may operate on the bar rotating at the proper rotational speed.

More specifically, in centerless grinding a bar is presented to a grinding wheel at surface speeds anywhere from 100 ft. per minute to as much as 1900 ft. per minute. The cutting tools in the cutting head of the bar peeler would not stand up if they attempted to machine the bar rotating in the higher portion of the aforesaid range of speeds. With the bar peeler disclosed herein, the cutting head and cutting tools are rotated at a preselected adjustable speed usually in the same direction as the bar. The speed of the cutting head is set at a value less than the speed of rotation of the bar whereby the difference in speed provides a relative or differential speed to which the cutting tools are subjected and which is within the operable range for the particular cutting tools being used.

Another feature of the invention is to provide a bar peeler having a cutting station with pre-settable means both in advance and beyond the cutting station for imparting controlled rotation to the bar and linear advance thereof through the cutting station with means for setting the cutting tools to provide a desired finished diameter for the bar, means for gaging the bar diameter, and means responsive to the gaging means when the bar is not of the desired finished size for adjusting the cutting tools.

Another feature of the invention includes control circuitry for setting the desired relative or differential speed between the cutting tools and the rotating bar with means for detecting the speed of the bar and the speed of rotation of the cutting tools and summing the difference and comparing with the pre-set desired relative speed to control the speed of the cutting tools.

DESCRIPTION OF THE PREFERRED EMBODIMENT

Figure 1:
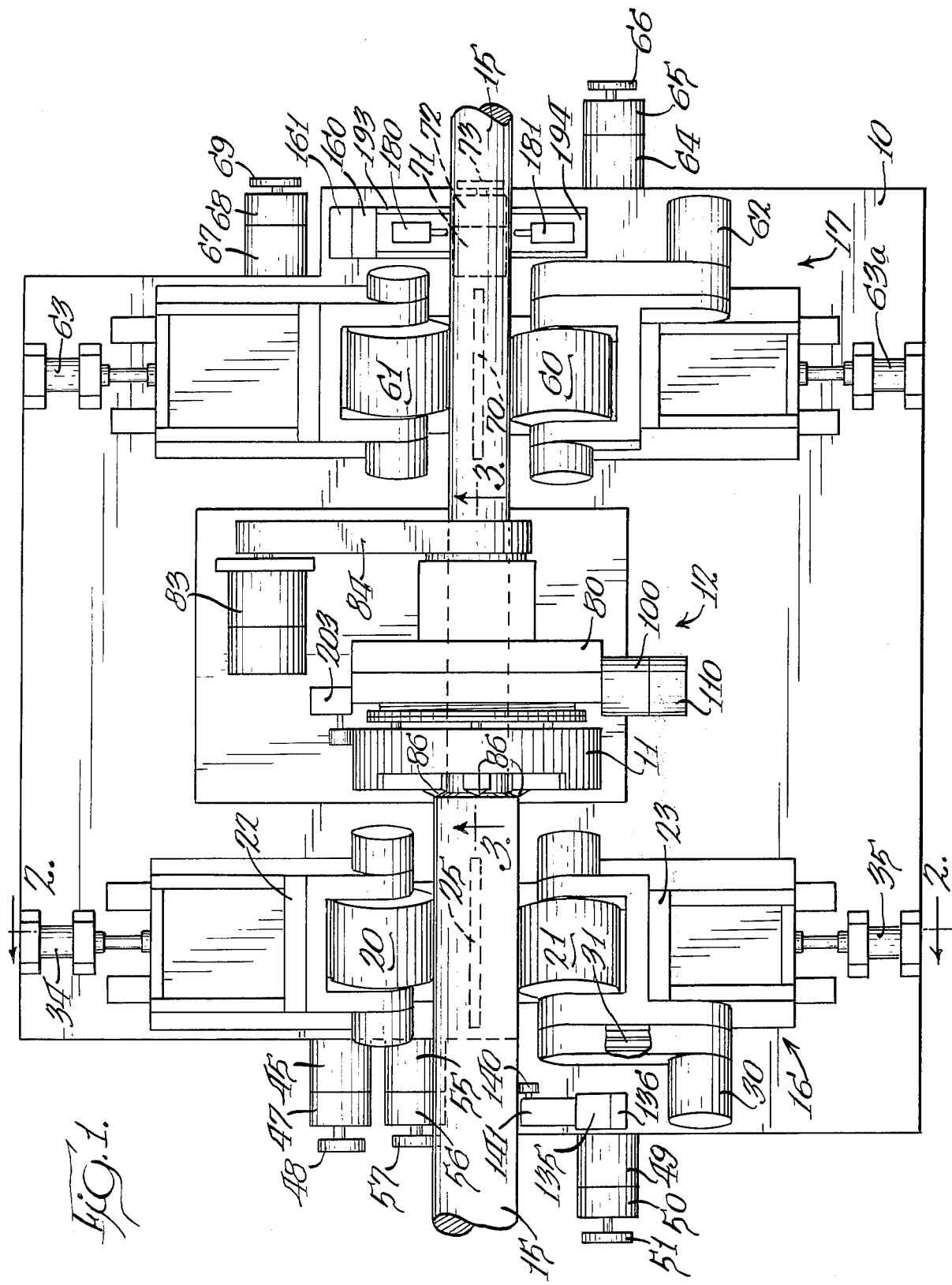
FIG. 1 is a plan view of the high speed centerless bar peeler.

The high speed centerless bar peeler is shown in FIG. 1 wherein a frame 10 has a rotatable cutting head 11 at a cutting station, indicated generally at 12.

Figure 2:
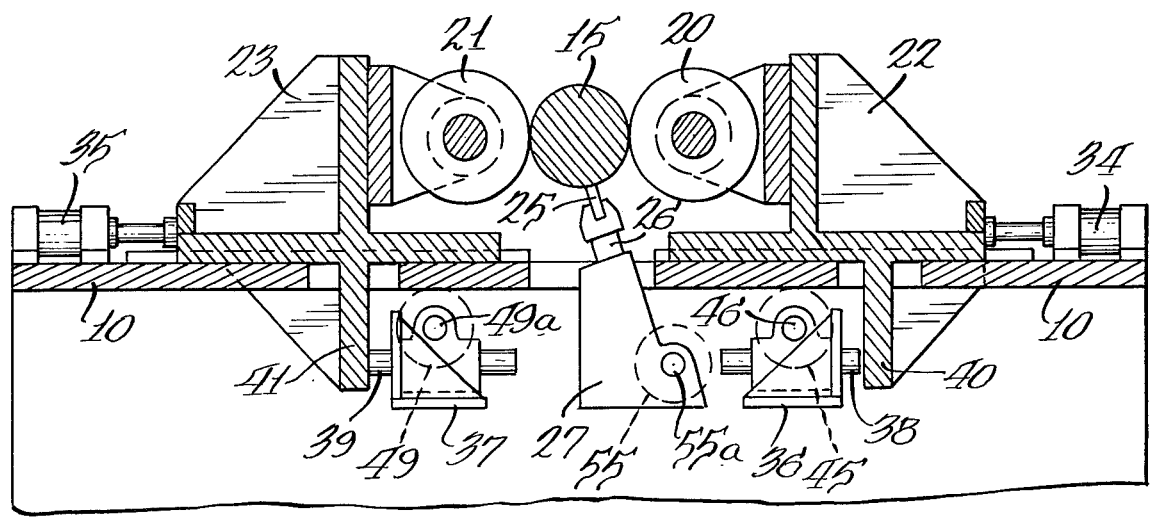
FIG. 2 is a vertical transverse section, taken generally along the line 2—2 in FIG. 1.

A workpiece in the form of a bar 15 is shown extending through the cutting station and in association with bar feed means at a bar feed-in station, indicated generally at 16, in advance of the cutting station 12 and bar feed means at a bar feed-out station, indicated generally at 17, beyond the cutting station 12. The bar feed means at each of the feed stations 16 and 17 is of the same construction and the feed means at station 16 is shown particularly in FIGS. 1 and 2. The bar feed means includes an idler wheel 20 and a drive wheel 21 spaced from each other and with these wheels being mounted on their respective slides 22 and 23 for movement toward and away from each other on the frame 10. A work rest including a blade 25 carried by a rod 26 movably mounted in a base 27 engages beneath the bar 15 for support thereof and positioning between the wheels 20 and 21. The drive wheel 21 is driven by means of a drive motor 30 which is connected by drive belts 31 to the drive wheel 21.

The idler wheel 20 and drive wheel 21 are yieldably urged toward each other in order to positively engage the bar 15 by a pair of cylinders 34 and 35, respectively, each mounted to the frame and having their respective rods connected to the slides 22 and 23, respectively. The positioning of the idler wheel 20 and drive wheel 21 is controlled by adjustable jacks 36 and 37, respectively, positioned within the frame 10 and each having a control rod 38 and 39, respectively, positioned in line with a depending part 40 and 41 of the slides 22 and 23. The control rod 38 of the jack 36 for the idler wheel 20 is positioned by a servo motor 45 connected to a shaft 46 geared to the control rod 38 and with the servo motor 45 having a positioning resolver 47. Additionally, there is a jack positioning hand wheel 48.

The control rod 39 for the jack for the drive wheel 21 is positioned by a servo motor 49 connected to a shaft 49a geared to the control rod 39 with there being a positioning resolver 50 and a jack positioning hand wheel 51. The force exerted by the cylinder 35 is greater than the force exerted by the cylinder 34 whereby the drive wheel 21 is positively positioned against the control rod 39 of its jack for accurate positioning of the bar 15. This causes the drive wheel 21 to be positioned to a predetermined centerline. The jacks 36 and 37 are positioned to a spacing slightly less than the diameter of the bar 15 which is presented therebetween so that the cylinders 34 and 35 can pinch the idler roll 20 and drive roll 21 against the bar.

Additionally, the work rest blade 25 is positioned by a servo motor 55 connected to a shaft 55a geared to the rod 26 of the work rest and with the servo motor 55 having a positioning resolver 56 associated therewith as well as a hand wheel 57.

As shown particularly in FIG. 1, the idler wheel 20 and drive wheel 21 are tilted whereby rotation of these wheels imparts rotation to the bar 15 and also causes linear advance of the bar.

The bar feed means at the feed-out station 17 are of the same construction as that described at feed-in station 16 including a drive wheel 60 and an idler wheel 61 which are tilted to impart rotation as well as linear movement to the bar with the drive wheel 60 being belt-driven from a motor 62. The slides mounting the drive roll 60 and idler roll 61 are urged toward each other by a pair of cylinders 63 and 63a, with the positioning of the slides and the wheels carried thereby being obtained by jack mechanism similar to that shown in FIG. 2. The jack for the drive wheel 60 has its control rod positioned by a servo motor 64 having a resolver 65 associated therewith as well as a hand wheel 66. The control rod of the jack for the idler wheel 61 is positioned by a servo motor 67 having resolver 68 associated therewith as well as a hand wheel 69. A work rest blade 70 is positioned by a servo motor 71 having a resolver 72 associated therewith as well as a hand wheel 73.

The space between the drive wheel 60 and the idler wheel 61 is less than the space between the corresponding wheels at the feed-in station 16 by the amount of material removed from the bar at the cutting station 12.

Since the drive wheels 21 and 60 are operating on a section of the bar 15 of different diameter, it is necessary to rotate these two wheels at different rates of speed in order to have identical surface speed of the two wheels which are in contact with the bar. A system for obtaining this result forms no part of the invention claimed in this application; however, reference may be made to Schaller application Ser. No. 407,980, filed Oct. 19, 1973, for disclosure of a system to control wheels at two different stations to maintain the same surface speed at both stations to prevent application of torque to a workpiece and such system may be incorporated in the structure disclosed in this application.

Figure 3:
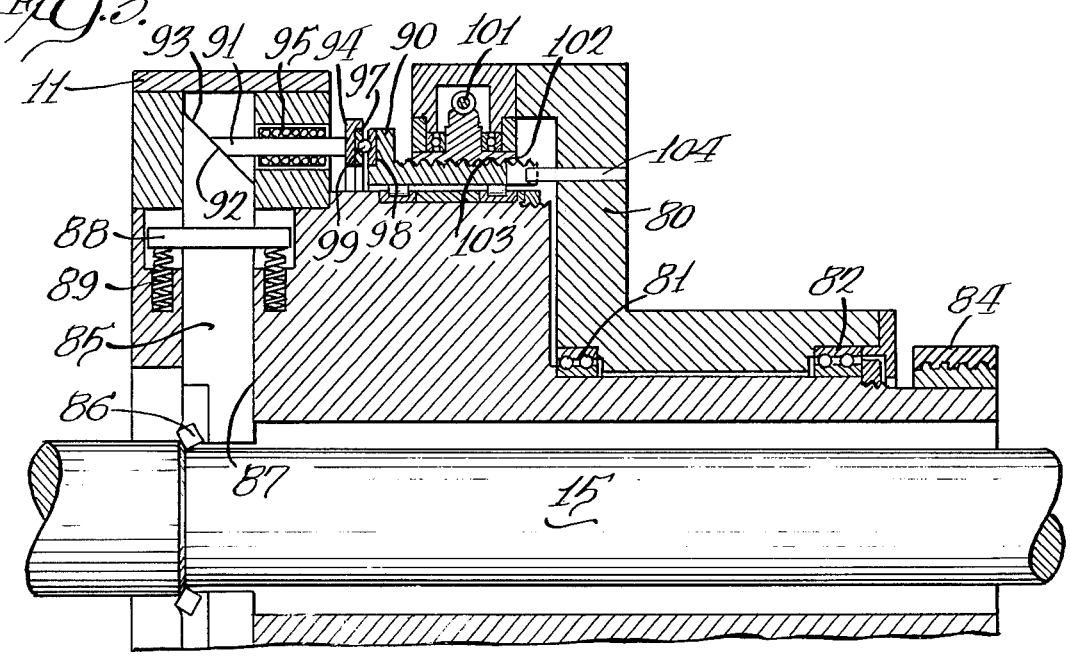
FIG. 3 is a view, on an enlarged scale taken generally along the line 3—3 in FIG. 1.

The cutting head 11 is shown more particularly in FIG. 3 and embodies a tubular body rotatably mounted in a housing 80 supported on the frame 10 by means of bearings 81 and 82. The cutting head 11 is rotated by a drive motor 83 connected thereto by a drive belt 84.

The cutting head 11 carries a plurality of radially extending tool holders 85 each having a tool 86 rotatable circumferentially about the bar 15 and about an axis concentric with the longitudinal axis of the bar. Each of the tool holders is movable in one of a plurality of bores 87 in the cutting head and has a flange 88 engageable by a plurality of springs 89 to urge the tool holder outwardly in the bore 87. The cutting position of each of the tools 86 is set by the position of an annular collar 90 movable lengthwise of the cutting head and which positions a plurality of pins 91 each having a cam 92 at the end thereof coacting with a cam 93 on the end of each of the tool holders. The pins 91 extend from an annular member 94 surrounding a part of the cutting head and with the pins guided for movement by bearings 95 within bores of the cutting head. The annular member 94 rotates with the cutting head while the annular collar 90 is fixed against rotation by mounting to the housing 80. A pair of wear plates 97 and 98 capture bearings 99 therebetween providing for relative rotation between the annular collar 90 and the annular member 94. The movement of the collar 90 lengthwise of the cutting head is obtained by a servo drive motor 100 which rotates a worm shaft 101 which rotates an annular worm wheel 102 having internal teeth in mesh with teeth on the collar 90, as indicated at 103. Rotation of the worm wheel causes linear advance of the collar 90 relative to the cutting head. A key 104 extends between the housing and the annular collar 90 to prevent rotation of the annular collar.

Rotation of the cutting head as well as the action of the springs 89 urges the tool holders outwardly to a position as controlled by the extent to which the pins 91 are extended. The servo motor 100 has a positioning resolver 110 associated therewith.

With the bar peeler located in a process line and with the bar 15 commonly being of substantial length, it is possible that bar 15 is positioned in an additional station, such as a centerless grinding station, wherein the bar must travel at a relatively high speed. In this instances, the rotation of the cutting head 11 can be set to have the cutting tools 86 travel in the same direction of rotation of the bar so that the tools are effectively exposed to a bar 15 rotating at a relatively slow speed within the prescribed range for the particular cutting tools. The drive motor 83 for the cutting head 11 is reversible in the event that the cutting tools 86 are to travel in a direction opposite to the rotation of the bar 15 if necessary to obtain the required differential speed.

Figure 4A:
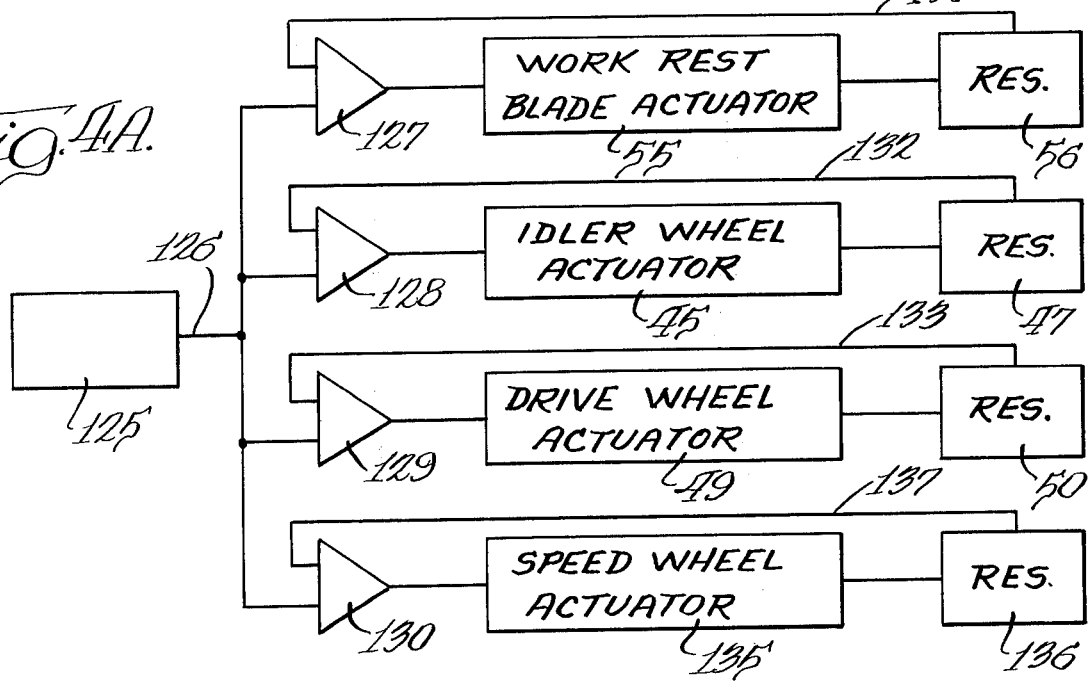
FIG. 4A is a schematic diagram of the circuit for establishing the set-up mode for the bar feed-in structure and additional structure associated therewith.

A schematic diagram in the set-up mode for the bar feed structure at the feed-in station 16 is shown in FIG. 4A. A dial unit 125 is connected by a line 126 to a series of amplifiers 127, 128, 129, and 130. The amplifier 127 extends to the servo motor actuator 55 for the positioning of the work rest blade with the resolver 56 being connected by a return loop 131 to the amplifier 127. The amplifier 128 connects the servo motor 45 for the idler wheel 20 with the resolver 47 connected by a return loop 132 to the amplifier 128. The amplifier 129 connects to the servo motor 49 for positioning the jack for the drive wheel 21 with the resolver 50 being connected by a return loop 133 to the amplifier 129. With the setting of a diameter into the dial unit 125 indicating the input diameter of the bar, the bar feed means are set up to receive the bar and with the spacing between the wheels being slightly undersized whereby the bar is firmly pinched by the wheels.

The amplifier 130 connects to a servo motor 135 associated with a speed sensing wheel and having a resolver 136 connected by a return loop 137 to the amplifier 130. The speed wheel is shown in FIG. 1 at 140 and has a tachometer 141 associated therewith. The speed wheel 140 and tachometer provide a reading of bar speed in surface feet per minute with this speed detection being utilized in the manner shown in FIG. 6 and as subsequently to be described. The speed sensing wheel is movably mounted on the frame 10 and positioned by the servo motor 135.

Figure 4B:
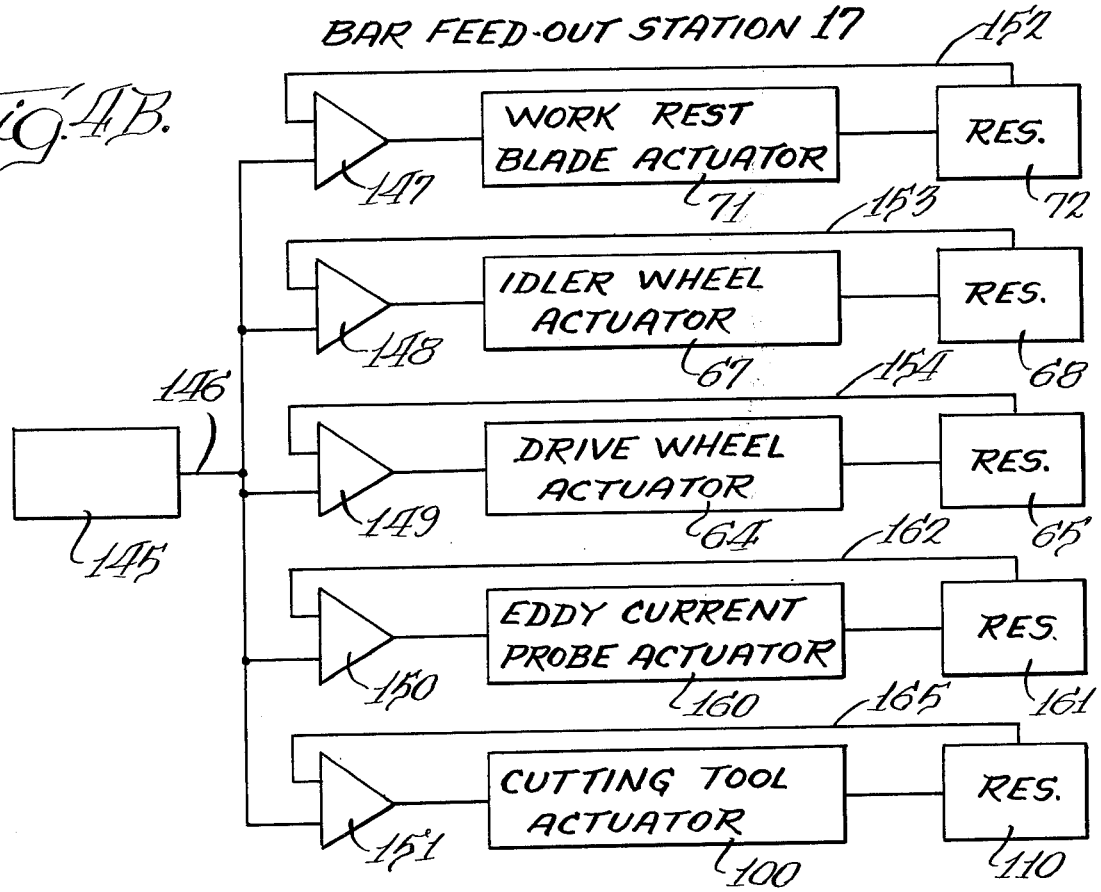
FIG. 4B is a schematic diagram of the control circuitry for setting up the structure of the bar feed-out mechanism as well as the bar gaging structure and adjusting structure for the cutting tools.

A schematic diagram for the set-up mode with respect to the bar feed means at the feed-out station 17 is shown in FIG. 4B wherein a dial unit 145 is connected by a line 146 to a series of amplifiers 147, 148, 149, 150, and 151. The amplifier 147 connects to the servo motor 71 for the work rest blade 70 with the resolver 72 connected back to the amplifier 147 by a loop 152. The amplifier 148 connects to the servo motor 67 for the jack associated with the idler wheel 61 and the resolver 68 is connected back to the amplifier 148 by a loop 153. The amplifier 149 connects to the servo motor 64 for the jack associated with the drive wheel 60 and with the resolver 65 associated therewith connected back to the amplifier by a return loop 154.

The amplifier 150 connects to a servo motor 160 for positioning eddy current probes, to be described, with a resolver 161 connected back to the amplifier 150 by a return loop 162. The amplifier 151 connects to the servo motor 100 for positioning the cutting tools 86 with the resolver 110 connected back to the amplifier 151 by a return loop 165. With the control circuit as shown schematically in FIG. 4B, the finished bar diameter is dialed into unit 145 with resultant control of the actuating servo motors for the work rest blade and the drive and idler wheels. Additionally, the eddy current probes are set as well as the cutting tools 86.

Figure 5:
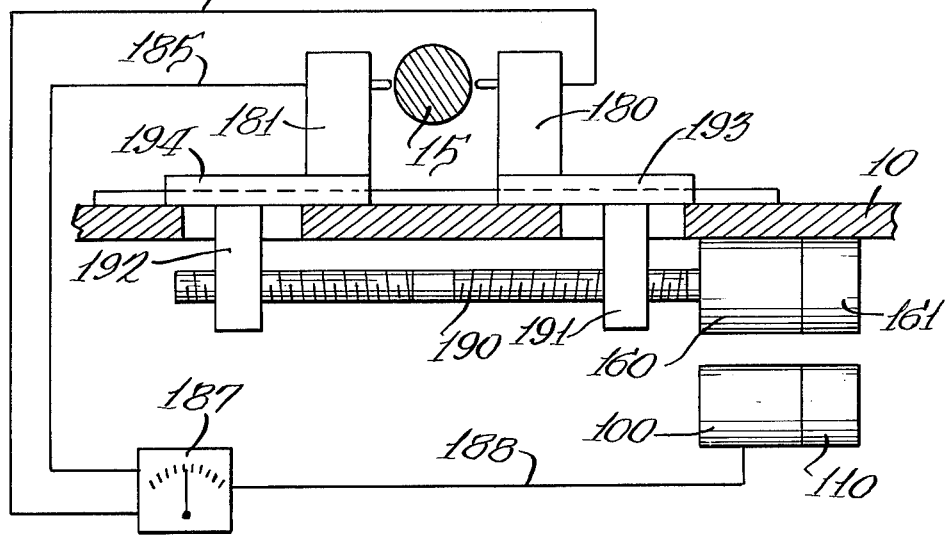
FIG. 5 is a schematic diagram of the probe loop in the cutting mode of operation.

The eddy current probes 180 and 181 are shown in FIG. 1 at the end of the bar peeler and to the right of the feed-out station 17, as viewed in FIG. 1. These eddy current probes gage the diameter of the finished bar 15. As shown in the probe loop schematic of FIG. 5, the eddy current probes 180 and 181 are connected by lines 185 and 186 to an averaging meter 187 which is connected by line 188 to the servo motor 100 for controlling the positioning of the cutting tools 86. This control circuit continuously gages the diameter of the finished bar and makes corresponding adjustments as required to the positioning of the cutting tools 86 to maintain the desired finished diameter. When in the cutting mode, the control circuit for the set-up mode, as shown in FIGS. 4A and 4B, would be de-energized.

In order for the eddy current probes to function properly, they must be initially set in the set-up mode and as previously described in connection with FIG. 4B. Servo motor 160 operates a lead screw 190 having oppositely threaded sections threaded to downward extensions 191 and 192 from slides 193 and 194, respectively, which are movably mounted on the frame 10 and which carry the respective eddy current probes 180 and 181.

Figure 6:
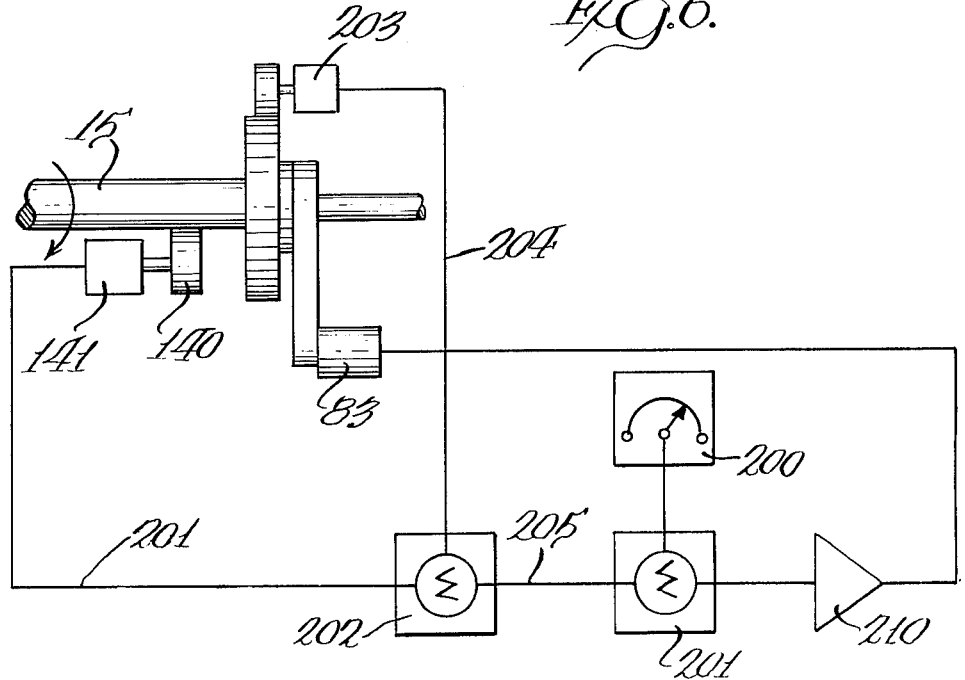
FIG. 6 is a schematic diagram of the speed loop in the cutting mode of operation.

In maximizing the rate of material removal from the bar 15, a primary consideration is the speed of the bar in surface feet per minute relative to the cutting tools. The speed control loop is shown in FIG. 6 wherein the desired relative or differential speed between the cutting tools and the bar 15 is set in by a dial unit 200 having an output to a summing unit 201. The speed of the bar 15 in surface feet per minute is detected by the speed wheel 140 and tachometer 141 which outputs through a line 201 to a summing unit 202. The summing unit 202 also receives a signal as to the speed of the cutting head 11 obtained by a speed reading unit 203 which delivers a signal to the summing unit 202 through a line 204. The summing unit 202 outputs through a line 205 to the summing unit 201. The summing unit 201 compares inputs as to the differential speed given by summing unit 202 with the desired differential speed set by dial unit 200. If there is a difference, an error signal is delivered to amplifier 210 which controls the drive motor 83 for the cutting head 11. In the event there is a match in the summing unit 201, there is no error signal and, therefore, no modification of the drive motor 83 for the cutting head 11.

With the high speed centerless bar peeler disclosed herein, it is possible to coordinate the operation of removal of material from a bar with other equipment in a process line, particularly equipment requiring high speed rotation of the bar, such as centerless grinders. The high speed centerless bar peeler, in effect, operates independently of other equipment in the process line, but provides for positive rotation and linear advance of the bar and with cutting thereof by cutting tools operating at a designed cutting speed of a certain number of surface feet per minute. Control circuitry provides for programming the cutting tools in a set-up mode for obtaining the desired finished diameter of the bar along with programming in a set-up mode of the bar feed structure at bar feed-in and bar feed-out stations. After the set-up mode has been obtained, the set-up circuitry is de-energized and in the cutting mode there is a speed loop for maintaining the desired differential speed between the cutting tool and the bars and also a probe loop for detecting the diameter of the finished bar and making an adjustment as necessary to the cutting tools in order to assure continued output of a bar of the desired finished diameter.

I claim:

1. A bar peeler positionable in a process line for removing material from a bar rotating at a high speed comprising, a frame having a cutting station, a bar feed-in station in advance of said cutting station, a bar feed-out station beyond said cutting station, means at each of the last two stations for rotating and linearly advancing a bar, a tubular cutting head at the cutting station having a central passage through which the bar travels and a plurality of cutting tools for travel circumferentially of the bar, means for rotating said cutting head about an axis concentric with said bar and in the same direction as bar rotation, means for setting said cutting tools to machine the bar to a predetermined diameter, means for gaging bar diameter after cutting, means responsive to the gaging means determining a size variation in the bar for adjusting the cutting tools, and means for maintaining a pre-set relative speed between said bar and cutting tools.

2. A bar peeler as defined in claim 1 wherein the means at the bar feed-in and bar feed-out stations each comprises an idler wheel, a drive wheel and a work rest positioned therebetween, means for setting the spacing between said wheels and work rest including adjustable stops for said wheels, a control circuit for setting said stops, means yieldably urging said wheels toward each other and with a greater force applied against said drive wheel to assure that the drive wheel is positioned against its stop.

3. A bar peeler as defined in claim 2 wherein said control circuit for setting the stops at the bar feed-out station also includes control elements for operating said cutting tool setting means and for setting said gaging means.

4. A bar peeler as defined in claim 1 wherein said means for maintaining a pre-set relative speed between said bar and cutting tools includes means for setting the desired relative speed, means for detecting the speed of bar rotation, means for detecting the speed of rotation of the cutting head, and means for summing the difference between the last two speeds and comparing the sum with the set desired relative speed.

5. A bar peeler as defined in claim 1 wherein said means for gaging the diameter of the bar includes a pair of eddy current probes, means mounting said probes for adjustment, a pair of spaced wheels at the bar feed-out station, means for positioning said wheels dependent on the diameter of a bar, and means for positioning said probes at a space setting simultaneously with the setting of the wheels beyond the cutting station.

* * * * *